July 17, 1928.

G. H. ALLEN

GAUGE

Filed May 20, 1925

1,677,424

INVENTOR
Gerald H. Allen
BY
Francis D. Hardesty
his ATTORNEY

Patented July 17, 1928.

1,677,424

UNITED STATES PATENT OFFICE.

GERALD H. ALLEN, OF DETROIT, MICHIGAN.

GAUGE.

Application filed May 20, 1925. Serial No. 31,693.

The present invention relates to gauges and specifically to one particularly adapted for the setting of the gap between the rotor and stator of "Ford" or "Fordson" magnetos and the individual magnet faces on the flywheel rotor.

In the Ford and Fordson magnetos, the stator consists of an annular frame carrying the cores and windings constituting the armature of the magneto and this frame is provided with a flange by means of which it is secured to the upper part of the crankcase of the engine. The rotor carrying permanent magnets is secured to the rear end of the engine crank shaft and constitutes the flywheel. Attached to the flywheel rotor is the transmission and these together form a unit which is bulky and difficult to handle.

Heretofore, it has been customary to attach the stator to the crank case, then attach the rotor unit to the crank shaft and if the gap between stator and rotor did not happen to be correct, as is the usual case, the rotor and stator had to be both dismounted and shims put in or taken out in order to space them properly.

The present invention is intended to obviate this extra handling and has for one of its objects a gauge by means of which the relative location of the stator and rotor can be accurately and easily determined before they are assembled together.

Another object is a gauge by means of which the pole faces of the rotor can with the least difficulty be accurately set to parallelism and in the same plane.

The invention will be more easily described and understood by referring to the accompanying drawing in which—

Figure 1:
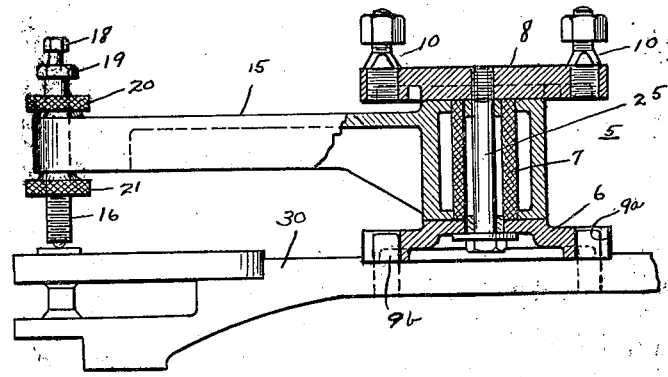
Fig. 1 shows a partial vertical section of the gauge attached to the rotor of the magneto.

As indicated in the drawings, the gauge consists of a standard indicated as a whole by the numeral 5. This standard is made of a base member 6 supporting a bearing pin 7 extending upward from its central portion. Mounted on top of the bearing pin is an upper face member 8 of substantially the same size as the base member 6, but provided with ears 8ᵃ having threaded holes 8ᵇ. Member 8 will also be provided with other threaded holes 9 near its edges, all of which holes serve for the securing of studs 10 whereby said member may be secured in proper position relative to the stator of a Fordson or Ford magneto. Member 6 is provided with two notches 9ᵃ serving for the passage of the two dowels 9ᵇ found upon a Ford rotor and serving to locate the gauge. Member 6 is also provided with four other and shallower notches 9ᶜ which together with notches 9ᵃ fit over the six studs found on a Fordson rotor and serve to locate the gauge with respect thereto.

Adapted to rotate in a plane parallel with and between the outer faces of the parts 6 and 8 upon the bearing pin 7 is an arm 15. This arm is of approximately the same length as the radius of the magneto assembly and carries at its outer end in a tapered hole a threaded bolt 16 set perpendicular to the plane of rotation of the arm 15. The bolt 16 is preferably made of non-magnetic material, such as brass, and is provided at one end with a hardened surface, such as the inset steel piece indicated at 17. At its other end the bolt will be bored and tapped centrally for the insertion of a cap screw 18 which will also be hardened. There will also be a jam nut 19 for the purpose of locking the screw 18 in adjusted position. Before leaving the factory the bolt 16 will be accurately set by use of screw 18 and nut 19 so that its overall length will be .030 of an inch greater than the distance between the outer faces of members 6 and 8. The bolt 16 will also be provided with a knurled flange 20 a short distance from its upper end by means of which it may be screwed up and down in the tapped hole in the end of arm 15, a knurled nut 21 being used on one side of the arm for the purpose of securing the bolt 16 in vertically adjusted position.

In producing the gauge, the members 6 and 8 will have their outer faces ground accurately parallel and perpendicular to the axis of bearing pin 7. The bearing pin 7 will also be surfaced so as to give a smooth bearing surface for the arm 15. Further, the upper and lower faces of the bearing end of arm 15 will be provided with smooth bearing surfaces and the whole assembly so constructed that the arm 15 will move about the bearing pin with no noticeable vertical play, and the assembly will be held together by means of a bolt 25 passing axially through the bearing pin as indicated in Fig. 1.

In using the gauge above described, it is first secured in place upon the magneto rotor 30 as indicated in Fig. 1. The base member 6 of the gauge is set over or between the dowels provided in the recess in the flywheel rotor adapted for the reception of crank shaft flange. When the gauge has been put in position as indicated the bolt 16 is adjusted vertically so that the end 17 of the bolt just touches the lowest pole face of the rotor. The arm 15 is then rotated about the standard and each of the pole faces is in turn adjusted until all are in the same plane as the lowest one and until the end 17 of the bolt 16 will touch each one. When this has been done the bolt 16 will be secured in its adjusted position by means of nut 21.

Figure 2:
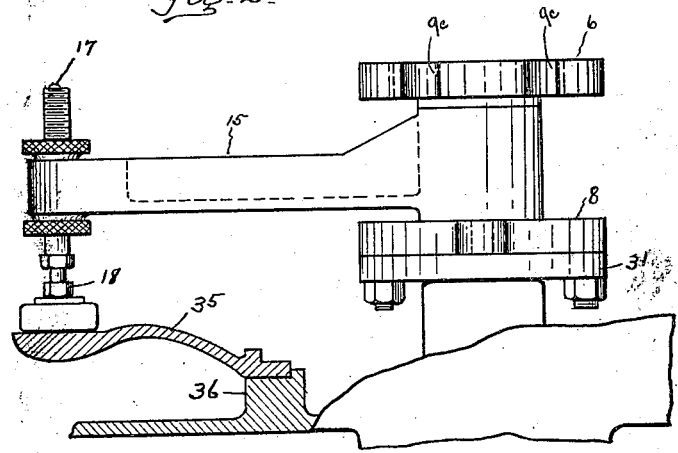
Fig. 2 is an elevation of the gauge being used in connection with the stator.
Figure 3:
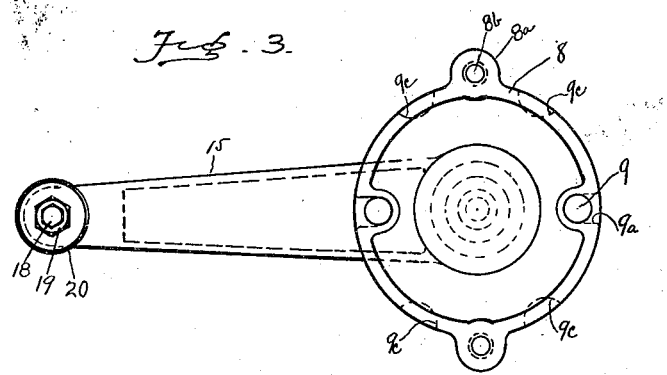
Fig. 3 is a plan of the gauge itself.

The gauge will then be secured to the flange 31 of the engine crankshaft as indicated in Fig. 2, in reversed position when compared with Fig. 1. This will bring the end 18 of bolt 16 into co-operative relation with the stator member 35 of the magneto. This stator member 35 is constructed and arranged to be secured to the casting 36 (a portion only of which is being shown) forming the upper half of the engine crank case and its adjustment to and from the rotor member has to be accomplished by the use of shims between the two parts 35 and 36. When the gauge is in position as in Fig. 2 and the stator 35 secured to the crank case, if the stator is in proper relative position with respect to the flywheel rotor, the end 18 of bolt 16 will just touch all of the core ends of the stator. The usual practice is to mount the stator without any shims between its flange and the crank case and when this is done, the space between the end of the gauge and the faces of the core ends is equal to the thickness of the shims that should be behind the stator flange, the space being measured by using the shims themselves as feelers. If the stator is not machined true, as sometimes happens, this is readily determined and can be taken care of easily by padding with short shims or pieces at the proper places.

When these several adjustments just mentioned have been made so that the pole faces on the rotor and the core ends on the stator all just touch the ends of the bolt 16 with the gauge secured in proper position, it will be found that, when the parts are assembled, the rotor will be accurately positioned with its pole faces at the proper distance from the cores of the stator. As the bolt 16 is accurately adjusted to a length of .030 of an inch greater than the distance between the parallel outer faces of members 6 and 8, the magneto gap will be accurately .030 of an inch. This distance has been determined to be the best for the most efficient operation of the magneto.

It should be noted that the invention is not to be considered as limited to the specific form as described and illustrated, as this may be varied without departing from the spirit of the invention but is only to be limited by the scope of the claims which follow.

Claims:

1. A gap gauge comprising a standard having upper and lower parallel faces adapted to contact with the faces to be gauged, an arm extending from said standard, said arm carrying a pin substantially perpendicular to the planes of said parallel faces, which pin exceeds in length the distance between said parallel faces by a predetermined amount.

2. A gauge comprising a standard having lower and upper faces of comparatively large area and accurately parallel and a bearing pin between the faces and perpendicular thereto, and an arm adapted to rotate about said pin, said pin passing through one end of said arm, said arm carrying at its other end an adjustable gauge bolt whose overall length exceeds the distance between said faces by an accurately predetermined amount.

3. A gap gauge comprising a standard having lower and upper faces of comparatively large area and accurately parallel and a bearing pin between the faces and perpendicular thereto, and an arm adapted to rotate about said pin, said pin passing through one end of said arm, said arm carrying at its other end an adjustable gauge bolt whose overall length exceeds the distance between said faces by the required measurement of said gap.

4. A gap gauge for Ford and Fordson magnetos consisting of a standard having accurately parallel plane lower and upper faces adapted to be secured either to the flange of a Ford or Fordson crank shaft or to a Ford or Fordson flywheel, an arm rotatable about said standard parallel to and between the planes of the said faces and having one end at the standard, and a gauge bolt adjustable perpendicularly to said planes in the outer end of said arm.

5. A gap gauge for Ford and Fordson magnetos consisting of a standard having accurately parallel plane lower and upper faces provided with means for securing said faces either to the flange of a Ford or Fordson crank shaft or to a Ford or Fordson flywheel, an arm rotatable about said standard parallel to and between the planes of the said faces and having one end at the standard, and a gauge bolt adjustable perpendicularly to said planes in the outer end of said arm, said bolt being of an overall length accurately .030 of an inch greater than the distance between said faces.

6. A gap gauge for Ford and Fordson magnetos consisting of a standard having accurately parallel plane lower and upper faces, the latter adapted to be secured to the flange on a Ford or Fordson crank shaft and the former provided with means for securing to a Ford or Fordson flywheel, an arm rotatable about said standard parallel to and between the planes of the said faces and having one end at the standard, and a gauge bolt adjustable perpendicularly to said planes in the outer end of said arm, said bolt being of non-magnetic material provided with hardened steel ends.

7. A gap gauge for Ford magnetos consisting of a standard having accurately parallel plane lower and upper faces, the latter adapted to be secured to the flange on a Ford or Fordson crank shaft and the former provided with means for securing to a Ford or Fordson flywheel, an arm rotatable about said standard parallel to and between the planes of the said faces and having one end at the standard, and a gauge bolt adjustable perpendicularly to said planes in the outer end of said arm, said bolt being of non-magnetic material provided with hardened steel ends and being provided with means for adjusting its length.

GERALD H. ALLEN.